United States Patent
Lee et al.

(10) Patent No.: US 7,453,844 B1
(45) Date of Patent: Nov. 18, 2008

(54) DYNAMIC ALLOCATION OF CHANNELS IN A WIRELESS NETWORK

(75) Inventors: Siu Fai Lee, Tseung Kwan O (HK); Yat Tung Cheung, Tai Kok Tsui (HK)

(73) Assignee: Hong Kong Applied Science and Technology Research Institute, Co., Ltd., Hong Kong (CN)

( * ) Notice: Subject to any disclaimer, the term of this patent is extended or adjusted under 35 U.S.C. 154(b) by 1123 days.

(21) Appl. No.: 10/278,062

(22) Filed: Oct. 22, 2002

(51) Int. Cl.
*H04Q 7/00* (2006.01)
*H04B 7/216* (2006.01)

(52) U.S. Cl. .................. 370/329; 370/335; 370/342; 370/441

(58) Field of Classification Search .......... None
See application file for complete search history.

(56) References Cited

U.S. PATENT DOCUMENTS

| | | | | |
|---|---|---|---|---|
| 5,097,499 A * | 3/1992 | Cosentino | ............... | 455/435.1 |
| 5,751,708 A * | 5/1998 | Eng et al. | ............... | 370/395.42 |
| 5,787,077 A * | 7/1998 | Kuehnel et al. | ............ | 370/331 |
| 5,937,353 A * | 8/1999 | Fapojuwo | ................... | 455/444 |
| 5,960,344 A * | 9/1999 | Mahany | .................... | 455/432.2 |
| 6,049,549 A * | 4/2000 | Ganz et al. | ................... | 370/449 |
| 6,308,072 B1 * | 10/2001 | Labedz et al. | .............. | 455/448 |
| 6,393,261 B1 * | 5/2002 | Lewis | ......................... | 455/103 |
| 6,625,612 B1 * | 9/2003 | Tal et al. | ..................... | 707/102 |
| 6,747,976 B1 * | 6/2004 | Bensaou et al. | .......... | 370/395.4 |
| 6,754,194 B2 * | 6/2004 | Ramaswamy et al. | ....... | 370/331 |
| 7,120,142 B1 * | 10/2006 | Oz et al. | ..................... | 370/352 |
| 2003/0135797 A1 * | 7/2003 | Choi | .......................... | 714/704 |
| 2006/0291580 A1 * | 12/2006 | Horvitz | ...................... | 375/265 |

* cited by examiner

*Primary Examiner*—Edan Orgad
*Assistant Examiner*—Blanche Wong
(74) *Attorney, Agent, or Firm*—Fulbright & Jaworski L.L.P.

(57) ABSTRACT

Bandwidth is deployed within a wireless network efficiently by making multiple channels available to wireless devices within a coverage area and intelligently controlling access to those channels. For example, channels to which each wireless device is registered with may be based on quality of service factors. According to one embodiment, upon attempted access to a wireless network channel, an access point grants or refuses a wireless device access based on quality of service factors relating to the device, the channel and the other channels that the device could access.

50 Claims, 5 Drawing Sheets

DYNAMIC ALLOCATION OF CHANNELS IN A WIRELESS NETWORK

FIELD OF INVENTION

The present invention relates generally to communications systems and, more particularly, to dynamically allocating wireless channels to wireless devices for information communication.

BACKGROUND OF THE INVENTION

Wired local area and wide area networks have become widespread and offer the ability to interconnect computers and other devices together thus permitting the sharing of data and other resources between machines. Wired networks offer significant advantages over conventional mechanisms for delivering and sharing all types of data, including non-real time data, e.g., data for which the timing of delivery is not critical, and real time data, e.g., data for which the timing of delivery is critical. Such non-real time data may comprise data processing data packets, such as database queries, static Internet content, electronic mail messages, and the like. The aforementioned real time data may comprise, for example, voice data (e.g., streaming voice data communicated as voice over Internet protocol (VoIP), video data and other data that is converted to corresponding signals which users perceive as a continuous stream (e.g., streaming multimedia content), and the like.

Wireless local area networks (WLANs) have recently become available as an alternative to wired local area networks. WLANs offer the same advantages of wired networks generally at a lower cost because less physical infrastructure and labor is required to install a WLAN. With a WLAN, wires are replaced with wireless links between an access point (AP) and wireless devices. Wireless devices may include desktop computers, portable computers, personal digital assistants (PDAs), printers, servers, and/or other devices that exchange data via wireless links.

An access point typically transmits and receives data to and from a wireless device within a coverage area. The coverage area typically corresponds to the inside of an office, house or other area of operation. Each wireless device may exchange data with the access point while in the coverage area and contends for the bandwidth provided by the access point with other wireless devices in the coverage area.

Data exchanged within WLANs generally is transmitted via radio frequency (RF) signals or optical signals. Wireless network connectivity differs from wired networks in that the transmission medium is subject to interference, high error rates and other factors that may limit or change bandwidth and/or data throughput.

With the exception of physical transmission differences, a WLAN typically employs a software and hardware architecture that is analogous to a wired network. WLANs, for example, commonly use the well-known OSI reference model which defines a communications protocol "stack." WLANs also generally use a media access control (MAC) layer as part of this stack. The MAC layer may be responsible, for example, for controlling access to the WLAN by wireless devices. However, there are generally several differences between the MAC layer of a wired and wireless network.

Various MAC approaches for WLANs have been proposed. These approaches generally use polling techniques to find an available transmission channel and then transmit on the first available channel. The channels may include different frequency channels or portions of one or more different frequency channels pursuant to a code or time division multiple access scheme. As to any particular channel, the IEEE 802.11 media access control standard proposes a random access technique which uses a carrier sense with collision avoidance (CSMA/CA) scheme. This scheme is also widely implemented in wired networks. Pursuant to CSMA/CA, a device waits until no other device is transmitting on a chosen channel and then transmits data. If a collision occurs, the transmitting device backs off a random interval of time and begins again if the channel is clear. Pursuant to this technique, individual wireless devices eventually get access to the channel that the device is trying to access. However, this technique does not ensure an optimum allocation of wireless devices and/or data transmission among available channels.

Polling techniques have also been used to control access to wireless communications channels. Using polling techniques, wireless devices wait until they are polled by a master in order to transmit data. Polling techniques may be more successful at allocating devices to available communications channels. However, polling techniques generally require that a new MAC layer be provided in wireless devices. This requires deploying specially adapted hardware and/or replacing hardware within wireless devices. Moreover, such polling techniques and sequences typically are not efficient in allocating bandwidth among many devices with randomly and rapidly changing bandwidth needs.

In the case of multi-cast packet transmissions, such as those identified in the IEEE 802.11 standard, the sender sends one copy of content to multiple devices over the network. This keeps the sender from clogging or loading the network with duplicative packet content. However, multi-cast packets are sent without acknowledgement. Due to the bit error rate of a wireless medium and/or collisions from other multi-cast or uni-cast traffic, many multi-cast packets may not be received properly. Also, many multi-cast schemes such as the one identified in the IEEE 802.11 standard do not provide for packet acknowledgement at the receiver. Therefore, packets not properly received by a device are generally lost for that device. Therefore, multi-cast packet traffic is more susceptible degrading channel interference due to collisions and bit error rate than other types of packet transmission.

U.S. Pat. Nos. 6,049,549 to Ganz, et al., 5,751,708 to Eng, et al., and 6,393,261 to Lewis disclose technology relevant to wireless communication. The reader is directed to the disclosures of these patent documents for a better understanding of prior attempts at addressing the needs of wireless communication systems.

There is a need in the art for an efficient technique for managing bandwidth in a WLAN, such as a bandwidth management technique that does not require changing the MAC layer of wireless devices within the WLAN. There is a further need in the art for a technique for efficiently allocating wireless channels within a WLAN, such as a channel allocation technique that allows channels to be assigned efficiently to requesting wireless devices that takes account of quality of service requirements of each wireless device. There is still a further need in the art for a technique that implements intelligence to manage all available channels, such as to coordinate communications across the channels, such as an intelligent channel management technique that takes advantage of the existing MAC layer protocols to ensure that wireless devices within the WLAN are allocated efficiently among the available channels.

SUMMARY OF THE INVENTION

The present invention is directed to systems and methods which provide for dynamic allocation of bandwidth in a wireless network using intelligent channel assignment techniques. According to embodiments of the present invention, bandwidth may be deployed efficiently within a wireless local area network (WLAN), or other network employing wireless information communication links, by making multiple channels available to wireless devices within a coverage area and controlling access to those channels by controlling which channels each wireless device is registered with, such as based on quality of service (QoS) factors. Program logic for requesting access to a channel is operable upon a wireless user device. Program logic for managing channel allocation of multiple channels is operable upon a wireless access point.

According to a preferred embodiment method of the present invention, upon attempted access to a WLAN channel, a wireless device is granted or refused registration with that channel based on factors (e.g., QoS factors) relating to the device, the channel that the device attempts to access, and/or the other channels that the device could access. If registration is granted, the device may follow MAC or other protocols to exchange data with the wireless network. If registration is refused, the device preferably attempts to register on the next channel. The method may make the same registration decision relative to the next channel, preferably again based on factors relating to the device, the channel and/or the other channels that the device could access and grants or denies access accordingly. In this manner, a device is refused registration to any channel of the WLAN until registration is attempted on a channel that facilitates efficient and/or optimized system performance, e.g., registration to the channel by the particular wireless device makes sense from a quality of service standpoint.

In addition, the channel characteristics may be dynamically changed, such as to maintain quality of service, resulting in devices on a channel which no longer meet a particular criteria no longer being served by a particular channel. In these scenarios, preferred embodiments provide a method which de-registers the non-conforming devices, which may then register on other channels.

The aforementioned channels themselves may be different frequency channels, TDMA channels, CDMA channels, FDMA channels or other well-known radio channel schemes and are preferably generally non-overlapping or otherwise orthogonal. Additionally or alternatively, channels utilized according to the present invention may implement diversity, such as spatial, angular, polarization, and/or combinations thereof, in order to provide desired orthogonality. For applications involving multi-cast packet transmission, one or more channels may be dedicated, whether exclusively or temporarily, to carrying multi-cast packets. Similarly, for applications involving transmission of a variety of different data types having differing data transmission issues, such as with non-real time and real time data, one or more channels may be dedicated, whether exclusively or temporarily, to carrying a particular data type.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION

Figure 1:
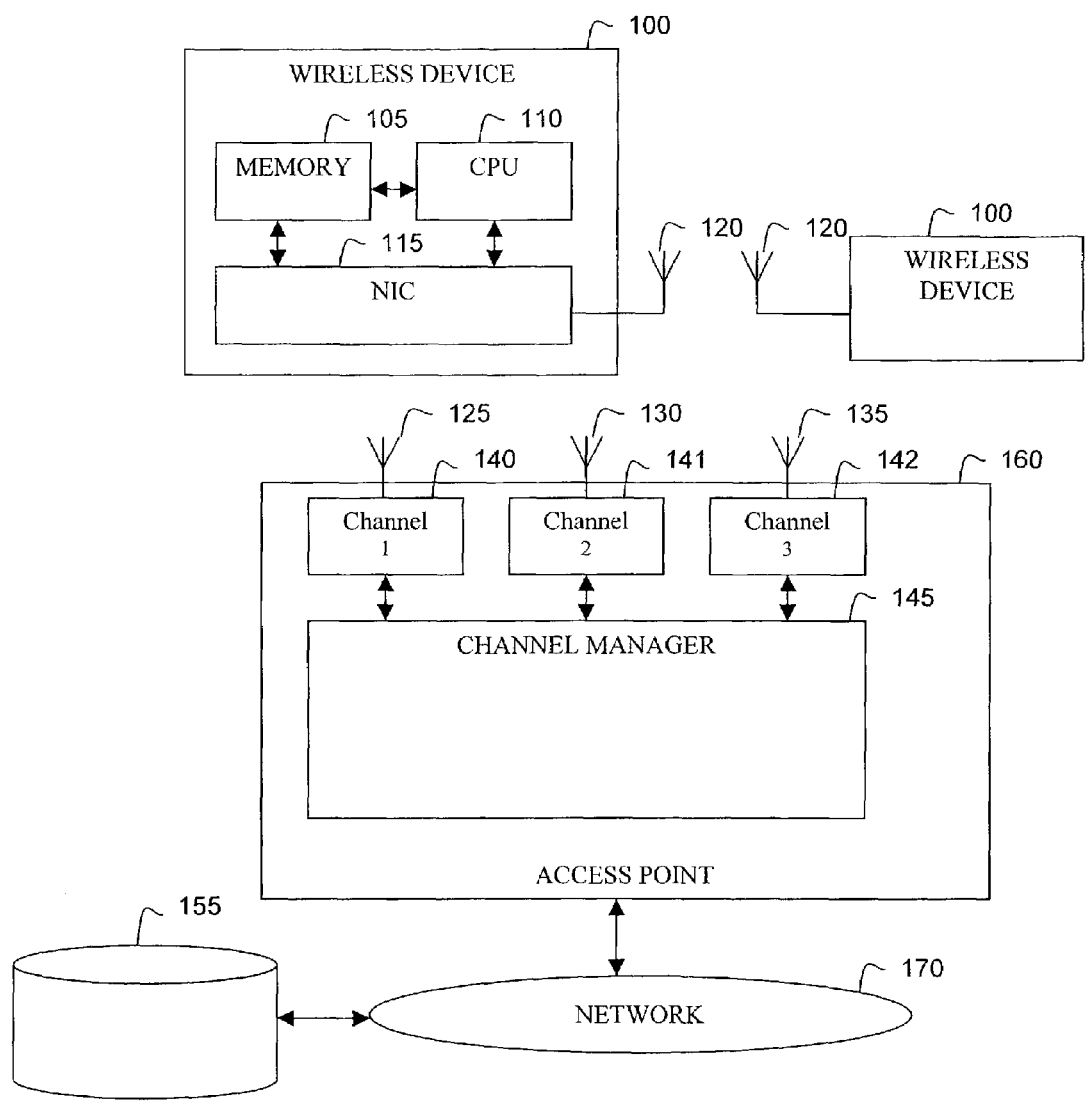
FIG. 1 depicts a functional block diagram of an interaction between wireless devices and an access point according to an embodiment of the present invention.

FIG. 1 depicts a functional block diagram of an interaction between wireless devices and an access point according to an embodiment of the present invention. Referring to FIG. 1, a plurality of wireless devices 100 are within range of access point 160. The access point 160 has multiple, preferably non-overlapping or otherwise substantially orthogonal, channels with which it can exchange data with wireless devices within a coverage area around access point 160.

Each wireless device 100 may include memory 105, a central processing unit or processor 110, a network interface card (NIC) 115 and an antenna 120. For example, one or more wireless devices 100 may comprise a personal computer, a personal digital assistant (PDA), and/or other processor based information processing or communication device.

The memory 105 may be used to store application programs and data. The application programs may include a World Wide Web browser program for exchanging data with servers and other computers over the Internet. Browsers typically include software for rendering web pages, presenting video and audio signals among other features. The application programs may also be any other convenient programs, without limitation, including a program that exchanges data with other computers over the Internet or other network. The application programs may also include software for carrying out communications protocols with wireless networks, for example, http, IP, udp, ftp, telnet and/or any other convenient communications protocol.

The CPU 110 preferably processes the program instructions in order to execute programs stored in memory. The CPU 110 may further operate to control wireless communication, such as by supplying control signals to NIC 115. However, it is expected that NIC 115 will include some processor capability and, thereby, provide at least some level of control with respect to communication of information via wireless links.

The NIC 115 may include hardware and software for carrying out low-level protocols for driving the antenna 120 and accessing the WLAN among other things. The NIC generally includes or utilizes a media access control (MAC) layer, all or part of which may be implemented on the NIC. For example, part of the MAC layer may be stored in memory and executed by the CPU 110. The NIC facilitates wireless device 100 communicating data between application programs that are run by the CPU 110 and other servers and computers that are accessible by the WLAN.

The NIC 115 preferably includes modulation and signaling features, e.g., modem and/or radio, that drive the antenna 120 thus allowing the wireless device to transmit and receive data to and from the access point 160 of the illustrated embodiment. The NIC 115 of a preferred embodiment also generally determines what channels are available for transmission, scans for an available channel, and issues an access request including access data which may be granted or denied according to an embodiment of the present invention. The NIC may operate in accordance with the IEEE 802.11 protocol or any other convenient protocol.

Although antenna 120 is represented as a radio frequency (RF) transducer in the illustrated embodiment, it should be appreciated that wireless communication links based upon other signal propagation technologies may be utilized in addition to or in the alternative to RF links according to the present invention. For example, rather than a RF transducer, antenna 120 may comprise a light energy transducer, such as a LASER transceiver or infrared (IR) light emitting diode (LED) for providing a wireless link.

The access point 160 is preferably adapted to provide for information communication on at least two channels. The access point 160 may include a corresponding antenna or other transducer for each channel, depending on the implementation of the channels. Referring to FIG. 1, the access point is depicted as having three antennas 125-135 and three separate corresponding channel radios 140-142, each channel radio preferably having one of the aforementioned at least two channels associated therewith. Of course, transducers and/or channel radios utilized according to the present invention may have a plurality of channels associated therewith, if desired.

The three channels of the illustrated embodiment are preferably non-overlapping or otherwise substantially orthogonal. For example, the different channels may be different frequency division multiple access (FDMA) channels, different time division multiple access (TDMA) channels, different code division multiple access (CDMA) channels, combinations thereof or other convenient orthogonal channels.

The access point 160 of the illustrated embodiment is coupled to network 170. The network may include any convenient form of network, such as a local area network, metropolitan area network, wide area network, an intranet, the Internet, a telephone network, and/or combinations thereof, and may include interconnected computers or other processor-based devices (whether implemented as user terminals, servers, intelligent network nodes, etcetera), hubs, bridges and any number of other network elements known in the art. After the access point successfully registers a wireless device on a particular wireless channel, the wireless device may exchange data with the network 170, and therefore systems connected thereto, via the access point 160.

The access point 160 of the illustrated embodiment includes a channel manager 145. The channel manager preferably carries out the low level communications protocols for communicating with the wireless devices and controlling the channel radios. The channel manager also preferably arbitrates transmission of data between the wireless devices, via the antennas of the access point, and communicates with database 155 and/or other portions of network 170 (not shown).

The channel manager 145 of the illustrated embodiment preferably receives data, including access requests and access data, from the wireless devices 100 that seek to exchange data via the wireless LAN. The access request itself generally includes the request and the identification information for the wireless device. For example, pursuant to the MAC protocol of the IEEE 802.11 standard, the identification information may comprise the MAC address of the wireless device. This identification information is preferably part of the access data that is communicated to the access point during the access request. The following additional or alternative access data may be provided by the wireless devices to the access point during a request for access: a user id and/or password for the user of the wireless devices; a minimum and/or maximum required bandwidth for a session; the class of user; the class of service requested; the priority of the user or wireless device—i.e. very important person (VIP) status; latency and jitter requirements for the session for real-time applications and data; a type of category of data to be transmitted; and other information relevant to the data access desired.

In addition to or in the alternative to including access data in an access request, some or all of the access data may be stored in a location assessable by access point 160, e.g., in database 155. For example, channel manager 145 may cooperate with database 155 to correlate some or all of the desired access data with a portion of access data included in the access request, such as the MAC address of the device or a user ID of the user. Either of these pieces of information, or similar unique information, may be used by the access point, together with information stored in the database, to identify some or all of the remaining access data.

In operation according to a preferred embodiment, the access point determines whether to grant or deny access to the requested channel based on the access data, the number of channels available, and/or the characteristics of the requested channels as compared to the access data and other factors. Accordingly, preferred embodiments of the present invention provide for intelligent channel assignments which efficiently and/or optimally allocate available bandwidth, manage data throughput, provide quality of service, etcetera across a plurality of channels. In contrast to operation of the present invention, today, a WLAN client chooses a channel to associate with based on that channel's signal strength. Consequently, there may be a case when many clients register with a channel while another channel is idle or with very few clients. However, according to an embodiment of the present invention, the access point provides a load-balancing scheme among multiple non-interfering channels so that clients, bandwidth, and/or data throughput will be more evenly distributed and/or distributed according to the client's particular access demands/requirements.

Load-balancing schemes of the present invention may be implemented during the initial assignment of channels and/or to re-distribute active users on the fly to maintain load balance. The load-balancing scheme may also adapt dynamically to other changing conditions, such as when the number of channels changes dynamically.

For example, consider an access point having the aforementioned three channel radios with three corresponding antennas, each operating in a non-overlapping channel. When one of the channels fails, such as due to a failure of a channel radio and/or antennas, the channel allocation scheme preferably redistributes users on the failed channel to the remaining two operable channels. When the fault is repaired, e.g., the channel radio and/or antenna is replaced or fixed, the channel allocation scheme preferably recognizes the availability of the third channel and rearranges some of the existing users to the newly available channel dynamically to achieve load balancing or other desired operational characteristics.

Also consider an access point with three channels operable in a power-saving mode. Initially, the access point may only make available two of the three available channels, e.g., power-up two of the three channel radios and associated antennas, and operate in two non-overlapping channels. When the number of users and/or data communication capacity utilization increases to a certain level, the access point may power up the third channel radio and associated antenna and reassign some users of initial two channels to the newly activated channel.

According to another embodiment of the present invention, the access point may provide guaranteed bandwidth over the wireless medium, or other quality of service metric, to VIP users. For instance, when a VIP client associates with a particular channel, the channel manager may reassign some or all of the active clients associated with that channel (except the VIP user and perhaps other particular users, e.g., other VIP users) to other channels. Thus, the VIP client may enjoy all or a particular minimum level of bandwidth availability.

In communicating in a wireless medium according to the IEEE 802.11 protocol standard, one should listen to the media to ensure there is no traffic before transmitting its own data. If the media is not idle, it will back off for a random period before repeating this process. This collision avoidance based mechanism does not work very well when real-time data and non-real-time data is to co-exist on a channel.

For instance, real-time data, such as for voice applications, requires transmission of a packet in constant or predictable period, e.g. 5 ms, to avoid jittering or other effects of latency. However, the packet payload, although transmitted in frequent bursts, is typically very small. In other words, voice applications generally do not require particularly high bandwidth but do present demands with respect to latency. On the other hand, non-real-time data traffic such as ftp generally consumes high bandwidth, typically having relatively large data packets associated therewith, but often allows for high latency. If an ftp session is performing a transfer via a particular channel, voice applications utilizing the same channel may experience unacceptably high latency.

Embodiments of the present invention address the above problem by the access point assigning clients to channels based on their type of data being transferred, or other access metric. For example, real-time data transmission may be supported by one or more channels, while non-real-time data transmission may be supported by other one or more channels. The separation of real-time data and non-real-time data to different channels avoids the disruptions of real-time data from non-real-time data.

In operation, the assignment characteristics of the channels may be changed dynamically. Initially all channels may, for example, operate in a mode which is best suited for non-real-time data. When a real-time data client arrives, one of the channels may have control characteristics associated therewith changed, such as by channel manager 145, to be more suitable for use in carrying real-time data. The change of channel characteristic may make existing connections (existing use of the channel by particular wireless devices) not compatible. According to one embodiment of the present invention, the access point rearranges existing connections to other compatible channels. The rearrangement mechanism is preferably transparent to existing clients and the client sessions may be maintained on other channels.

When a Denial of Service (DOS) attack (or similarly heavy utilization or fault) occurs with respect to one channel, clients associated with that channel will find it very difficult to transmit data. According to another embodiment of the present invention, the access point may de-associate all clients (or perhaps some clients, such as all clients except those with a very large number of data packet transmissions) with that channel and reassign them to other channels. According to this embodiment of the invention, the existing client sessions will preferably not be terminated and, therefore, will be continued to be served. This fault recovery mechanism may become operative when a channel is suddenly overwhelmed by packets such as DOS attacks. Moreover, the recovery mechanism is preferably transparent to existing clients. Their sessions may be maintained even though the bandwidth of the sessions may be degraded.

Figure 2:
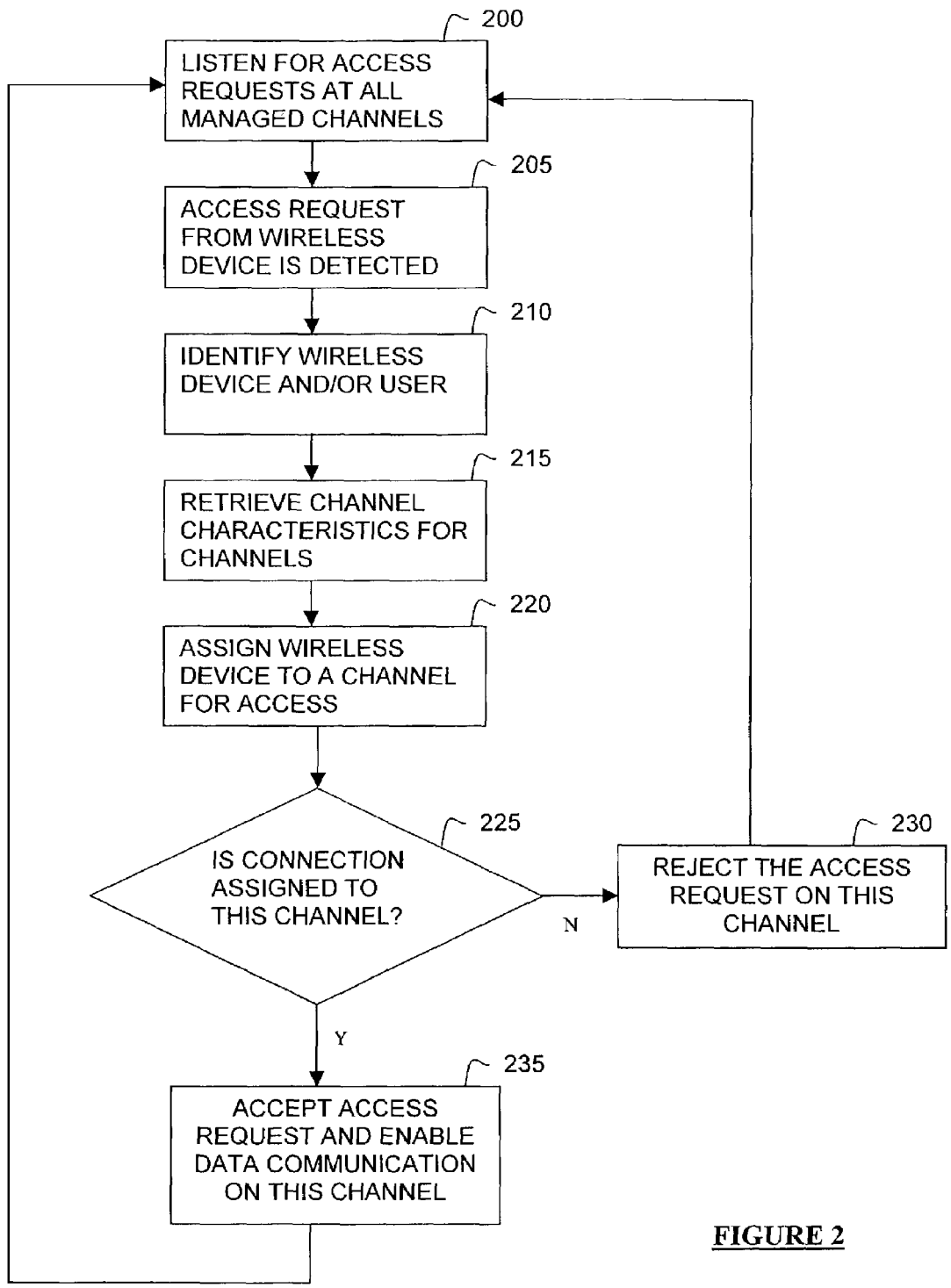
FIG. 2 depicts a method of operating an access point to assign multiple, non-overlapping wireless channels to multiple wireless devices according to an embodiment of the present invention.

FIG. 2 depicts a method of operating an access point to assign multiple, non-overlapping wireless channels to multiple wireless devices according to an embodiment of the present invention. Referring to FIG. 2, in step 200, the access point listens for access requests by wireless devices on all channels associated with the access point. This may be performed by the channel manager 145 which receives access data from the antennas 125-135 via the channel radios 140-142. In step 205, a connection from a wireless device is detected, e.g., an access request transmitted on a particular channel associated with access point 160.

In step 210, the access point identifies the wireless device or user of the wireless device by the MAC address or, for example, the user id of the user. In the latter case, the access point may require the user of the wireless device to enter a user id and password as part of the access process. If the user id and password do not match any corresponding entry in the database 155, then the access point denies access to the wireless device and its user. However, upon successfully identifying the user, the access point retrieves the access data for the user from transmissions from the wireless device and/or from the database 155 depending on the configuration of the wireless device and access point. Such access data may include the quality of service to be afforded to the user, the type of data normally transmitted by the user, known limitations with respect operation of the wireless device (e.g., channels not supported, throughput limitations, user preferences, etcetera), and the like.

In step 215, the access point retrieves the channel characteristics for the requested channel as well as for the other channels of the access point. The channel characteristics for each channel may include bandwidth, present utilization, real-time vs. non-real time data, signal strength and other channel characteristics. Based on the access data and the channel characteristics of the channels provided by the access point, in step 220, the channel manager determines if the particular wireless device should be assigned to the channel.

For example, channel manager 145 may not only determine that the current channel is appropriate (e.g., an optimum channel for providing quality of service, load balancing, and/or the like) for providing data communication with respect to the particular wireless device, but may review the status of all channels and assign the wireless device and/or user to a particular one of the available communication channels provided by the access point.

In step 225, if the assigned channel is the same as the channel to which access is presently requested then in step 235 the access point accepts registration of the wireless device/user on that channel and the wireless device/user may exchange data with the access point over that channel until the device/user is unregistered from that channel. If in step 225 the assigned channel is not the same as the channel to which access is presently requested, then in step 230, the access point denies registration of the wireless device on the requested channel, perhaps providing information to the wireless device with respect to a particular channel upon which the wireless device may register. This causes the wireless device to attempt registration on another channel, e.g., the next channel within the channel scheme of the access point or a particular channel indicated by the access point.

In an embodiment where the wireless device attempts registration with respect to a next channel in the channel scheme, the wireless device may cycle through all of the channels, attempting access to each, until registration is granted on the assigned channel. In an embodiment where the wireless device is provided information with respect to a particular channel upon which to register when refused registration on a previous channel, the wireless device may then register upon that channel. Such an embodiment may eliminate a step of communicating an access request and initiate payload data communication upon the particular channel indicated by the access point in order to increase system efficiency. However, embodiments of the present invention may again have the wireless device transmit an access request on the particular channel indicated by the access point in order to assure that channel utilization has not altered to a point in the interim that registration of the wireless device upon that channel, although initially assigned by the access point to the wireless device, is no longer desirable. In such a situation, the preliminary assignment of another channel may again be provided by the access point and the wireless device denied registration to the current channel.

Additionally or alternatively, embodiments of the present invention may implement intelligent channel selection with respect to wireless devices requesting channel access. For example, a wireless device may determine a type or category of data to be transmitted and initially request access to a particular channel from the knowledge that this particular channel is typically used to serve that type of data. For example, system defaults may be established that even numbered channels generally serve non-real time data and odd numbered channels generally server real time data. Similarly, particular channels may be identified as those for providing a particular quality of service. Therefore, a wireless device may make an initial access request upon such a particular channel in order to obtain a desired level of quality of service. Of course, such a technique may be used in combination with the intelligent assignment of channels by the access point in order to more fully implement the concepts of the present invention, particularly in light of the access point having knowledge of the current status of each such channel and the operation of the wireless network.

After steps 230 and 235, step 200 begins again and all channels are "listened to" for additional access attempts by wireless devices. In this manner, a wireless device requesting access to the access point over a particular channel causes the access point to assign the wireless device to a channel. The access point then denies the wireless device access to all channels except the assigned channel. It should be appreciated that the preferred embodiment schemes discussed above takes advantage of the channel scanning and channel access protocols built into wireless devices, for example, conforming to the IEEE 802.11 standard and allows central control of channel allocation at the access point simultaneously.

Figure 3:
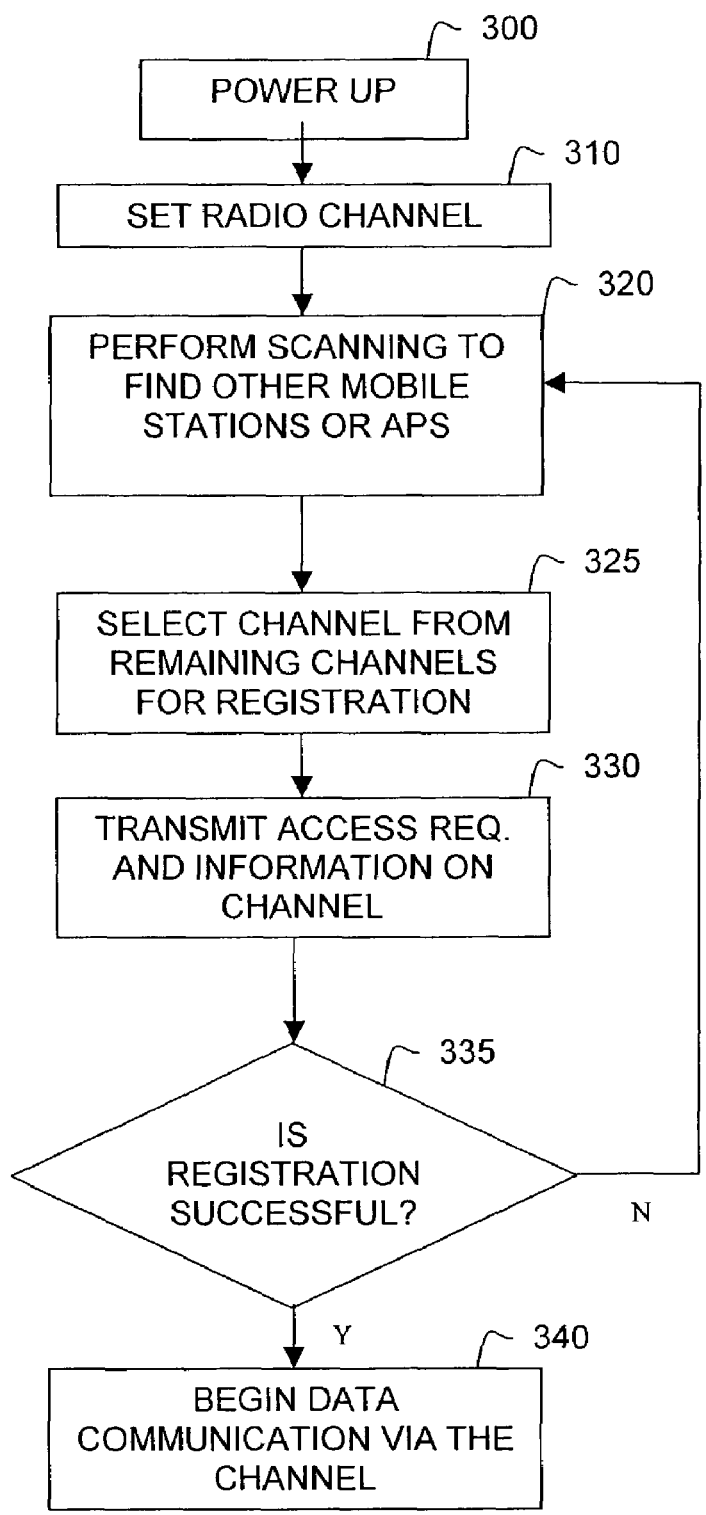
FIG. 3 depicts a method of operating a wireless device to scan available channels and issue registration requests until the wireless device is registered for a particular channel according to an embodiment of the present invention.

FIG. 3 depicts a method of operating a wireless device to scan available channels and issue registration requests until the wireless device is registered for a particular channel according to an embodiment of the present invention. Referring to FIG. 3, in step 300, power is applied to the wireless device which initializes itself in a well-known manner so that it is ready for a user to use. In step 310, the wireless device sets itself to a particular radio channel. This radio channel may be a pilot channel that the wireless device uses to retrieve data describing the channel allocation scheme corresponding to the WLAN coverage or service area within which the wireless device is located. Then in step 320, the wireless device performs channel scanning to find other wireless channels and mobile stations and/or access points accessible over those channels. Each wireless device and access point discovered is a potential destination for registration.

In step 325, the wireless devices selects a channel from the remaining channels identified during the channel scanning process. As mentioned above, the selected channel may be a "first" available channel in a series of channels or may be more intelligently selected, such as a channel generally utilized to provide some desired communication characteristic. The selected channel is used to attempt access to the wireless network. If the channel selected is the first channel on which a connection is attempted, then the remaining channels are the full pool of available channels. If other attempts have been made to access channels, then the remaining channels will be those channels from the pool to which access has not been attempted.

In step 330, the wireless device transmits an access request and access information on the channel. The access information may include, as discussed above, a user id and password, bandwidth requirements, latency requirements, jitter requirements, class of service information, class of user information, priority of user information, real-time vs. non-real time data information and any other convenient information that describes the characteristics of the service and bandwidth that is being requested.

The transmission from the wireless device 100 to, for example, an access point with multiple channels results in the access point evaluating the access request and information in view of the availability of bandwidth etcetera within all of the channels operated by the access point. Based on the access request and information, the access point assigns the wireless device to a channel and either sends a rejection or a registration acceptance back to the wireless device.

In step 335, the wireless device receives the response from the access point and determines whether or not the registration was successful. If it was not successful, then step 320 begins again and the channel scanning continues to select the next channel, a next channel meeting a particular criteria, or a particular channel assigned by the access point from the remaining channels for another access request. If the access request was successful, and the device is registered with the access point on the channel requested, then in step 340 the wireless device may begin data communication via the channel. The data communication may be done pursuant to 802.11 and/or any convenient protocol for data transmission.

Figure 4:
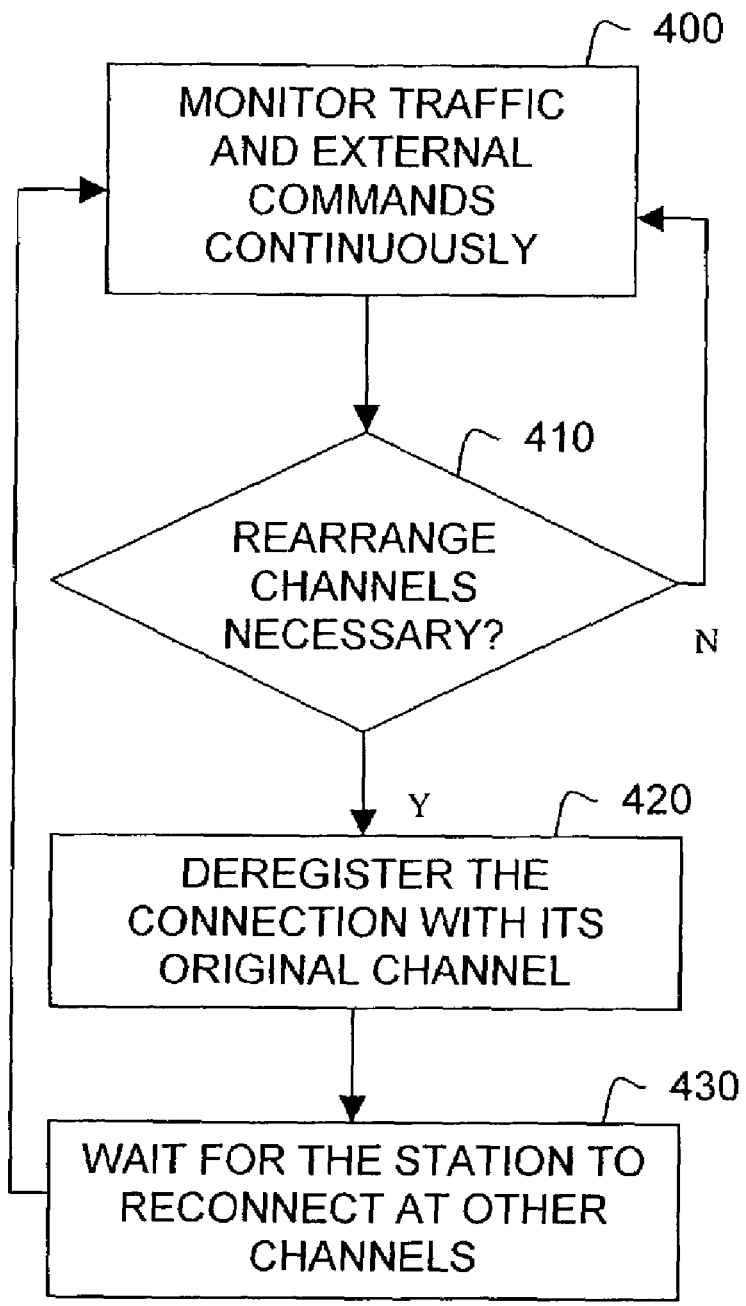
FIG. 4 depicts a method of operating an access point to dynamically reassign existing channels among wireless devices according to an embodiment of the present invention.

FIG. 4 depicts a method of operating an access point to dynamically reassign existing channels among wireless devices according to an embodiment of the present invention. Referring to FIG. 4, in step 400, the access point monitors traffic in its channels and/or external commands. Such external commands may be utilized to allow other third-party programs, such as an administrator console or traffic monitoring program running in the same access point, other access points, other servers, etcetera, to provide commands to the channel manager to rearrange channels. Accordingly, external commands may carry instructions for explicitly rearranging the channels. By monitoring the traffic in its channels, the channel manager of the access point is able to determine the bandwidth loading on each channel and the character of the data exchanged between the access point and each wireless device.

For example, the channel manager is preferably able to determine which devices are exchanging real-time data and which are exchanging non-real-time data, among other things, and therefore may redistribute channel assignments to consolidate transmission of like data. Similarly, when the bandwidth load on one or more channels becomes significantly greater than the bandwidth load on other channels, then a rearrangement of wireless devices among the channels becomes desirable.

In step 410, the access point determines whether a rearrangement of channel assignments is necessary. If not, then step 400 continues and the access point continues to monitor the connections. If so, then step 420 begins. In step 420, the access point determines which wireless devices should be reassigned to which channels. In some instances, when loading is very high, some wireless devices may be dropped and not reassigned for a period of time. The channel reassignment generally may be performed to balance the load among the available channels, to protect real-time data on certain channels from harmful contention from non-real time data users on the same channels, and to accommodate VIP or high-bandwidth users who have higher classes of service and who in some cases pay more for the service.

When devices are reassigned, then in step 420, the access point de-registers those wireless devices, such as by terminating communication on the channel with particular wireless devices and/or transmitting de-registration information, and assigns them to other channels. The wireless devices that are de-registered scan available channels and/or use information with respect to a newly assigned channel provided in the de-registration information and attempt to re-register on the remaining channels as illustratively shown and described with reference to in FIG. 3. In step 430, the access point waits for the station to request access at other channels and preferably accepts the access request from each wireless device that requests access to the reassigned channel to the extent that it is still available. In this manner, the access point is able to perform load balancing among users with different bandwidth needs, privileges and characteristics, dynamically, using existing protocols within the wireless devices.

Figure 5:
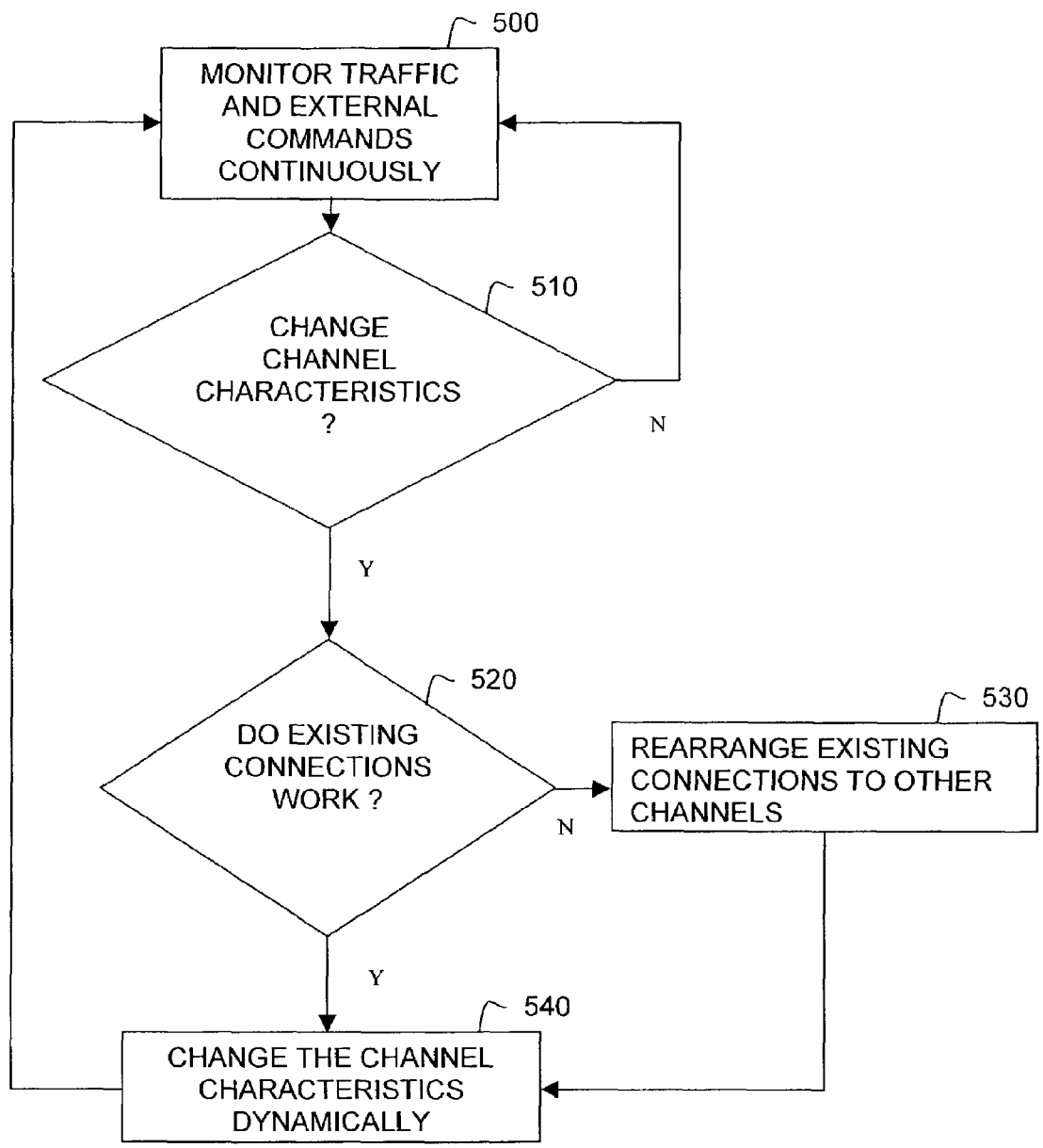
FIG. 5 depicts a method of operating an access point to change the characteristics of a channel and reassign non-conforming wireless devices on that channel to other channels according to an embodiment of the present invention.

FIG. 5 depicts a method of operating an access point to change the characteristics of a channel and reassign non-conforming wireless devices on that channel to other channels according to an embodiment of the present invention. Referring to FIG. 5, in step 500 the access point monitors traffic in its channels and/or external commands. By monitoring the traffic in its channels, the channel manager of the access point is able to determine the bandwidth loading on each channel and the character of the data exchanged between the access point and each wireless device. For example, the channel manager is able to determine which devices are exchanging real-time data and which are exchanging non-real-time data, among other things. As discussed above, monitoring of external commands may provide a means by which external programs can provide explicit instructions with respect to changing channel characteristics.

When real-time data being exchanged on one or more channels is in jeopardy of being interfered with by contention with bandwidth used by non real-time data on the same channel(s), the access point may determine that it is desirable to change the characteristics of one or more channels to limit the type of data or type of bandwidth requirements that can be accommodated on certain channels. If in step 510, the access point determines that any channel needs to change its characteristics, then step 520 begins. If in step 510, the access point determines that no channel needs to change its characteristics, then step 500 continues and the access point continues to monitor external commands.

In step 520, the access point determines whether changing the characteristics of the chosen channel will allow the existing connections to continue on the channel without conflict. For example, if there is no existing connection on the channel for which characteristics are changed, then no connection need be rearranged. Likewise, if all existing clients on a channel for which characteristics are changed can support the channel with the new characteristics, such as a new MAC protocol, then no connections need be rearranged. If one or more existing connections are in conflict with the channel characteristic change, then step 530 begins and connections are rearranged to other channels. This results in the access point de-registering and reassigning the connections in conflict to other channels substantially as discussed above with respect to FIG. 4. The wireless devices will then request registration on other available channels until they find and successfully register with the reassigned channel.

After the channels are reassigned in step 530, then step 540 begins. Step 540 may also begin if no conflict exists with the existing channels. In step 540, the characteristics of the chosen channel are changed dynamically and step 500 begins again. The access point will assign new connections to the changed channel from this point forward according to the new characteristics of the changed channel and the other channels until the changed channel is changed again.

It should be appreciated that implementation of embodiments of the present invention provides QoS functionality to a wireless medium by a unique medium access control protocol in which several non-overlapping channels are managed as one unit to provide QoS. Moreover, medium access control protocols of the present invention are applicable to any medium access control protocol, such as the IEEE 802.11 medium access control standard.

While particular embodiments of the present invention have been shown and described, it will be understood by those having ordinary skill in the art that changes may be made to those embodiments without departing from the spirit and scope of the present invention. For example, it should be appreciated that, although embodiments have been described above with reference to WLANs, the concepts of the present invention are not limited in applicability to any particular wireless network configuration. Accordingly, reference to WLANs in the foregoing Detailed Description is intended to encompass any number of wireless network configurations and links, including wireless wide area networks, wireless metropolitan area networks, cellular networks, and portions thereof. Similarly, the present invention is not limited to the use of communication protocols conforming to the OSI model or those which use MAC addressing.

It should be appreciated that, although preferred embodiments have been described herein with reference to wireless devices communicating wirelessly with an access point, there is no such limitation according to the present invention. The concepts of the present invention are applicable to establishing, controlling, and optimizing wireless communications between any number of devices. For example, systems and methods of the present invention may provide communications between a plurality of wireless terminals, such as in a peer to peer architecture.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of allocating a plurality of channels for accessing a wireless network among wireless devices, comprising:
   providing at least two channels for a coverage area originating from at least one access point;
   providing a channel manager that receives communications from the plurality of channels;
   receiving a registration request over a first channel of the plurality of channels from a high priority user of a wireless device;
   determining at the channel manager whether to grant or deny the registration request for the first channel based at least in part on traffic conditions on the plurality of channels;
   granting the registration request of the high priority user for a selected one of the plurality of channels;
   terminating the registration of at least one other wireless device on the selected channel as a function of granting the registration request of the high priority user;
   receiving a registration request from a terminated wireless device on a channel other than the selected channel;
   granting the registration request for the terminated wireless devices on the channel other than the selected channel; and
   repeating the following until access is granted for each wireless device seeking access:
      receiving a registration request over one or more remaining channels of the plurality of channels; and
      determining at the channel manager whether to grant or deny the registration request for the one or more remaining channels based at least in part on traffic conditions on the one or more remaining channels of the plurality of channels and user priority.

2. The method according to claim 1, wherein the channel manager allocates only real time data communication applications to certain ones of the at least two channels and non-real time data communication applications to other ones of the at least two channels.

3. The method according to claim 1, wherein the channel manager determines that the user is a high priority user based on information uniquely identifying the high priority user's wireless device.

4. The method according to claim 3, wherein said information uniquely identifying the high priority user's wireless device comprises a MAC address.

5. The method according to claim 1, wherein the channel manager determines that the user is a high priority user based on a user ID of the high priority user.

6. The method according to claim 1, wherein the channel manager performs the determining step to balance traffic load among the at least two channels.

7. The method according to claim 6, further comprising:
   performing a load balancing determination substantially continuously; and
   terminating the registration of a wireless device on a selected one of the at least two channels when the selected channel is overloaded as compared to other ones of the channels.

8. The method according to claim 7, wherein the channel manager keeps a session of the terminated wireless device active and re-establishes a link with the terminated wireless device upon successful re-registration of the terminated wireless devices on another one of the at least two channels.

9. The method according to claim 1, wherein the channels are time division multiple access channels.

10. The method according to claim 1, wherein the channels are code division multiple access channels.

11. The method according to claim 1, wherein the channels are frequency division multiple access channels.

12. The method according to claim 1, wherein said at least two channels are substantially orthogonal.

13. The method according to claim 1, wherein said at least two channels are substantially non-overlapping.

14. A method of allocating at least two channels for accessing a wireless network among wireless devices, comprising:
   providing at least two channels for a coverage area originating from at least one access point;
   providing a channel manager that receives communications from the at least two channels;
   scanning at each wireless device the available frequency channels and issuing a registration request on channels of said at least two channels until registration is successful;
   receiving a registration request over a first channel of the at least two channels from a wireless device;
   determining at the channel manager whether to grant or deny the registration request for the first channel based at least in part on traffic conditions on the at least two channels; and
   repeating the receiving and determining steps for each wireless device seeking access over remaining channels of the at least two channels until access is granted to each wireless device;
   wherein the channel manager allocates multi-cast packets to only certain ones of the at least two channels.

15. The method according to claim 14, wherein the multi-cast packets are allocated to a channel that carries only multi-cast packets.

16. A computer program product having a computer readable medium having computer program logic recorded thereon for allocation of channels of a plurality of channels in a wireless network, said computer program logic comprising:

program logic for receiving access requests to a channel of said plurality of channels, wherein a request for access to said channel comprises access information; and program logic for managing channel allocation of said plurality of channels in response to said request for access to said channel, wherein said managing channel allocation operates to determine a grant of access with respect to said channel as a function of said access information and a current status of each of said plurality of channels, balance traffic load among the plurality of channels by substantially continuously performing a load balancing determination, and terminate registration of a wireless device on a selected one of the plurality of channels when the selected channel is overloaded as compared to other channels of the plurality of channels.

17. The computer program product of claim 16, wherein said access information comprises information uniquely identifying a wireless device providing said request for access to said channel.

18. The computer program product of claim 16, wherein said access information comprises information identifying a user of a wireless device providing said request for access to said channel.

19. The computer program product of claim 16, wherein said access information comprises information with respect to a desired quality of service.

20. The computer program product of claim 16, wherein said access information comprises information with respect to a type of data to be communicated via said channel.

21. The computer program product of claim 16, wherein said managing channel allocation as a function of said access information and said current status of each of said plurality of channels operates to balance a traffic load with respect to said plurality of channels.

22. The computer program product of claim 16, further comprising:
program logic recorded on said computer readable medium, operable with program logic for requesting access, for selecting said channel from said plurality of channels for requesting access.

23. The computer program product of claim 22, wherein said selecting said channel is based at least in part on a type of data to be transmitted.

24. The computer program product of claim 22, wherein said selecting said channel is based at least in part on an amount of data to be transmitted.

25. The computer program product of claim 22, wherein said selecting said channel is based at least in part on a quality of service desired.

26. The computer program product of claim 22, wherein said selecting said channel is based at least in part on channel assignment information provided by said program logic for managing channel allocation.

27. The computer program product of claim 16, further comprising:
program logic, operable with said program logic for managing channel allocation, for dynamically re-allocating channel assignments.

28. The computer program product of claim 27, wherein said re-allocating channel assignments is based at least in part on a type of data transmitted.

29. The computer program product of claim 27, wherein said re-allocating channel assignments is based at least in part on a traffic loading distribution among said plurality of channels.

30. The computer program product of claim 27, wherein said re-allocating channel assignments is based at least in part on a quality of service metric.

31. The computer program product of claim 16, wherein said program logic for receiving access requests to said channel and said program logic for managing channel allocation of said plurality of channels is operable upon a wireless access point.

32. A computer program product having a computer readable medium having computer program logic recorded thereon for allocation of channels of a plurality of channels in a wireless network, said computer program logic comprising:
program logic for receiving access requests to a channel of said plurality of channels, wherein a request for access to said channel comprises access information; and program logic for managing channel allocation of said plurality of channels in response to said request for access to said channel, wherein said managing channel allocation operates to determine a grant of access with respect to said channel as a function of said access information and a current status of each of said plurality of channel; and operates to consolidate communication of data of a particular type upon select channels of said plurality of channels.

33. The computer program product of claim 32, wherein said particular type of data comprises non-real time data.

34. The computer program product of claim 32, wherein said particular type of data comprises real time data.

35. A system for allocation of channels of a plurality of channels in a wireless network, said system comprising:
means for receiving requests for access to a channel of said plurality of channels, wherein a request for access to said channel comprises access information; and means for managing channel allocation of said plurality of channels in response to said request for access to said channel, wherein said means for managing channel allocation operates to determine a grant of access with respect to said channel as a function of said access information and a current status of each of said plurality of channels, balance traffic load among the plurality of channels by substantially continuously performing a load balancing determination, and terminate registration of a wireless device on a selected one of the plurality of channels when the selected channel is overloaded as compared to other channels of the plurality of channels.

36. The system of claim 35, wherein said access information comprises information uniquely identifying a wireless device providing said request for access to said channel.

37. The system of claim 35, wherein said access information comprises information identifying a user of a wireless device providing said request for access to said channel.

38. The system of claim 35, wherein said access information comprises information with respect to a desired quality of service.

39. The system of claim 35, wherein said access information comprises information with respect to a type of data to be communicated via said channel.

40. The system of claim 35, further comprising:
means, operable with said means for receiving requests for access, for selecting said channel from said plurality of channels for requesting access.

41. The system of claim 40, wherein said selecting said channel is based at least in part on a type of data to be transmitted.

42. The system of claim 40, wherein said selecting said channel is based at least in part on an amount of data to be transmitted.

43. The system of claim 40, wherein said selecting said channel is based at least in part on a quality of service desired.

44. The system of claim 40, wherein said selecting said channel is based at least in part on channel assignment information provided by said means for managing channel allocation.

45. The system of claim 35, further comprising:
means, operable with said means for managing channel allocation, for dynamically re-allocating channel assignments.

46. The system of claim 45, wherein said re-allocating channel assignments is based at least in part on a type of data transmitted.

47. The system of claim 45, wherein said re-allocating channel assignments is based at least in part on a traffic loading distribution among said plurality of channels.

48. The system of claim 45, wherein said re-allocating channel assignments is based at least in part on a quality of service metric.

49. The system of claim 35, wherein said means for requesting access to said channel is operable upon a wireless user device and said means for managing channel allocation of said plurality of channels is operable upon a wireless access point.

50. A system for allocation of channels of a plurality of channels in a wireless network, said system comprising:
means for receiving requests for access to a channel of said plurality of channels, wherein a request for access to said channel comprises access information; and
means for managing channel allocation of said plurality of channels in response to said request for access to said channel, wherein said means for managing channel allocation operates to determine a grant of access with respect to said channel as a function of said access information and a current status of each of said plurality of channels; and
operates to consolidate communication of data of a particular type upon select channels of said plurality of channels.

* * * * *